United States Patent
Ruch et al.

(10) Patent No.: US 11,662,124 B2
(45) Date of Patent: May 30, 2023

(54) COMPACT ADSORPTION HEAT EXCHANGERS

(71) Applicant: International Business Machines Corporation, Armonk, NY (US)

(72) Inventors: Patrick Ruch, Pratval (CH); Jens Oliver Ammann, Zürich (CH); Bruno Michel, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/115,870

(22) Filed: Dec. 9, 2020

(65) Prior Publication Data

US 2022/0178592 A1 Jun. 9, 2022

(51) Int. Cl.
*F25B 17/08* (2006.01)

(52) U.S. Cl.
CPC ..................................... *F25B 17/08* (2013.01)

(58) Field of Classification Search
CPC ....... F25B 17/08; F25B 37/00; F28F 2245/00; F28F 13/003; F28F 13/185; F28F 1/30
USPC .......................................................... 62/476
See application file for complete search history.

(56) References Cited

U.S. PATENT DOCUMENTS

| | | | |
|---|---|---|---|
| 4,194,892 A | 3/1980 | Jones, II et al. | |
| 5,298,231 A * | 3/1994 | Rockenfeller | B01D 53/34 95/137 |
| 5,388,637 A * | 2/1995 | Jones | F25B 35/04 62/480 |
| 5,868,818 A | 2/1999 | Ogawa et al. | |
| 9,821,418 B2 | 11/2017 | Brunschwiler et al. | |
| 9,855,595 B2 | 1/2018 | Michel et al. | |
| 2003/0000385 A1 * | 1/2003 | Kawai | B01D 53/047 96/121 |
| 2014/0238071 A1 | 8/2014 | Brunschwiler et al. | |

(Continued)

FOREIGN PATENT DOCUMENTS

| | | | | |
|---|---|---|---|---|
| JP | 09273827 | | 10/1997 | |
| JP | 09273827 | A * | 10/1997 | ............... F28F 1/30 |

(Continued)

OTHER PUBLICATIONS

Golparvar, Behzad & Niazmand, Hamid & Sharafian, Amir & Ahmadian Hosseini, Amir Javad. (2018). Optimum fin spacing of finned tube adsorber bed heat exchangers in an exhaust gas-driven adsorption cooling system. Applied Energy. 232. 504-516. 10.1016/j.apenergy.2018.10.002. (Year: 2018).*

(Continued)

*Primary Examiner* — Steve S Tanenbaum
(74) *Attorney, Agent, or Firm* — Jeffrey M. Ingalls (57) ABSTRACT

According to certain embodiments, an adsorption heat exchanger (AdHEX) part is provided. The AdHEX part comprises a linear guiding element, and a plurality of planar structures that include fins. Each of the planar structures is: mounted on the linear guiding element via a joint element, the joint element configured to cooperate with the linear guiding element to form a slider joint, coated with an adsorbent coating, and fixed on the linear guiding element, at a respective position, by a fixing means that restricts linear sliding movement of each of the planar structures to form an arrangement of coated planar structures that are stacked along the linear guiding element.

23 Claims, 8 Drawing Sheets

(56) References Cited

U.S. PATENT DOCUMENTS

| | | | |
|---|---|---|---|
| 2016/0252278 A1 | 9/2016 | Goicochea et al. | |
| 2016/0320144 A1* | 11/2016 | Ruch | B01J 20/28004 |

FOREIGN PATENT DOCUMENTS

| | | | |
|---|---|---|---|
| JP | 2010270973 A | 12/2010 | |
| JP | 2013139906 A | 7/2013 | |
| WO | 9408185 A1 | 4/1994 | |
| WO | 2012085716 A1 | 6/2012 | |
| WO | 2013021994 A1 | 2/2013 | |
| WO | 2015104719 A2 | 7/2015 | |

OTHER PUBLICATIONS

Freni et al., (2015). Characterization of Zeolite-Based Coatings for Adsorption Heat Pumps. In Characterization of zeolite-based coatings for adsorption heat pumps (pp. 35-54) https://doi.org/10.1007/978-3-319-09327-7 (Year: 2015).*

Pires et al., "Recent developments on carbon capture and storage: An overview", Chem. Eng. Res. and Design, 89, 1446-1460 (2011).

Determan et al., "Heat- and Mass-Transfer Kinetics of Carbon Dioxide Capture Using Sorbent-Loaded Hollow Fibers", Ind. Eng. Chem. Res. 51, 495-502 (2012).

Ilis et al., "A new adsorbent bed design: Optimization of geometric parameters and metal additive for the performance improvement", Appl. Thermal Eng. 162 (2019) 114270, 12 pages.

Siqueira et al., "Carbon dioxide capture by pressure swing adsorption", Energy Procedia 114 (2017) 2182-2192, 13th Int'l Conf. on Greenhouse Gas Control Technol., GHGT-13, Nov. 14-18, 2016, Lausanne, Switzerland.

Riboldi et al., "Overview on Pressure Swing Adsorption (PSA) as CO2 capture technology: state-of-the-art, limits and potentials", Energy Procedia 114 (2017) 2390-2400, 13th Int'l Conf. on Greenhouse Gas Control Technol., GHGT-13, Nov. 14-18, 2016, Lausanne, Switzerland.

Joss et al., "Rational design of temperature swing adsorption cycles for postcombustion CO2 capture", Chemical Engineering Science 158 (2017) 381-394.

Mondino et al., "Effect of Gas Recycling on the Performance of a Moving Bed Temperature-Swing (MBTSA) Process for CO2 Capture in a Coal Fired Power Plant Context", Energies 2017, 10, 745, 18 pages.

Younas et al., "Feasibility of CO2 adsorption by solid adsorbents: a review on low-temperature systems", Int. J. Environ. Sci. Technol. DOI 10.1007/s13762-016-1008-1, 22 pages.

Zhu et al., "Study of a novel rapid vacuum pressure swing adsorption process with intermediate gas pressurization for producing oxygen", Adsorption (2017) 23:175-184, DOI 10.1007/s10450-016-9843-4.

Moran et al., "Role of Pressure Drop on Rapid Pressure Swing Adsorption Performance", Ind. Eng. Chem. Res. 2017, 56, 5715-5723.

Urich et al., "Multi-Model Predictive Control of a Novel Rapid Pressure Swing Adsorption System", 2017 American Control Conference Sheraton Seattle Hotel May 24-26, 2017, Seattle, USA, p. 4392-4398.

Griffin et al., "Industrial energy use and carbon emissions reduction in the chemicals sector: A UK perspective", Applied Energy 227 (2018) 587-602.

Song et al., "Alternative pathways for efficient CO2 capture by hybrid processes—A review", Renewable and Sust. Energy Rev. 82 (2018) 215-231.

Ammann et al., "Characterization of transport limitations in SAPO-34 adsorbent coatings for adsorption heat pumps", Int'l J. of Heat and Mass Transfer 129 (2019) 18-27.

Ammann et al., "Sorption rate enhancement in SAPO-34 zeolite by directed mass transfer channels ", Int'l J. of Heat and Mass Transfer 130 (2019) 25-32.

Baksh et al., "Lithium Type X Zeolite as a Superior Sorbent for Air Separation", Separation Science and Technology, vol. 27, Issue 3, 1992, 277-294.

Jayaraman et al., "Stable oxygen-selective sorbents for air separation", Chemical Engineering Science (2005), vol. 60, Issue: 3, pp. 625-634.

Cheng et al., "A New Class of Non-Zeolitic Sorbents for Air Separation: Lithium Ion Exchanged Pillared Clays", Ind. Eng. Chem. Res., 1995, 34 (6), pp. 2021-2028.

Gaffney, "Porous solids for air separation", Current Opinion in Solid State and Materials Science vol. 1, Issue 1, Feb. 1996, pp. 69-75.

Ott et al., "ROI and TCO Analysis of the First Production Level Installation of Adsorption Chillers in a Data Center", 16th IEEE ITHERM Conference, 2017 IEEE, 6 pages.

Ammann et al., "High-Power Adsorption Heat Pumps Using Magnetically Aligned Zeolite Structures", ACS Appl. Mater. Interfaces, Jul. 2019, 10 pages.

Ammann et al., "Quantification of heat and mass transport limitations in adsorption heat exchangers: Application to the silica gel/water working pair", International Journal of Heat and Mass Transfer, Feb. 19, 2018, ScienceDirect, 11 pages.

Golparvar et al., "Optimum fin spacing of finned tube adsorber bed heat exchangers in an exhaust gas-driven adsorption cooling system", Applied Energy 232, Published Date: Dec. 15, 2018, 13 pages.

Freni et al., "SAPO-34 Coated Adsorbent Heat Exchanger for Adsorption Chillers", Applied Thermal Engineering, Feb. 20, 2015, DOI: 10.1016/j.applthermaleng.2015.02.052, 18 pages.

Freni et al., (2015). Characterization of Zeolite-Based Coatings for Adsorption Heat Pumps. In Characterization of zeolite-based coatings for adsorption heat pumps (pp. 35-54). https://doi.org/10.1007/978-3-319-09327-7.

Tamainot-Telto et al. "Novel compact sorption generators for car air conditioning", International Journal of Refrigeration, 32(4), 727-733. https://doi.org/10.1016/j.ijrefrig.2008.11.010.

Wilde et al., "CooLMUC-2: A Supercomputing Cluster with Heat Recovery for Adsorption Cooling", 33rd SEMI-THERM Symposium, 2017 IEEE, 7 pages.

International Search Report and Written Opinion for Application PCT/EP2021/084094, dated Dec. 3, 2021, 12 pages.

* cited by examiner

COMPACT ADSORPTION HEAT EXCHANGERS

BACKGROUND

The present disclosure relates in general to the field of adsorption heat exchangers parts, methods of fabrication thereof, and systems equipped with such adsorption heat exchanger parts. In particular, the present disclosure is directed to an adsorption heat exchanger (AdHEX) part comprising a linear guiding element and planar structures with fins, wherein the planar structures are coated with an adsorbent coating and mounted on the linear guiding element.

SUMMARY

According to certain embodiments, an adsorption heat exchanger (AdHEX) part is provided. The AdHEX part comprises a linear guiding element, and a plurality of planar structures that include fins. Each of the planar structures is: mounted on the linear guiding element via a joint element, the joint element configured to cooperate with the linear guiding element to form a slider joint, coated with an adsorbent coating, and fixed on the linear guiding element, at a respective position, by a fixing means that restricts linear sliding movement of each of the planar structures to form an arrangement of coated planar structures that are stacked along the linear guiding element.

The AdHEX part design described above allows the planar structures to be first coated with the adsorbent coating and then brought close to each other along the linear guiding element (thanks to the slider joints), to achieve smaller gaps than would normally be allowed by the coating process. This, in turn, allows more compact arrangements of planar fins to be obtained, with improved heat transfer rates. Thus, the present AdHEX designs and methods of fabrication thereof allow small gaps to be achieved between the planar structures, which results in favorable performance in terms of power and energy density. In particular, the proposed design allows substantially improved performance in terms of the product of adsorption cooling power and energy per unit volume (of adsorber medium).

For instance, in certain embodiments, an average gap between each pair of consecutive ones of the fixed planar structures is between 500 and 900 µm. Such gaps cannot be achieved with prior art methods such as described in the background section. Preferably, the planar structures are essentially shaped as disks. The average thickness of the coated planar structures will preferably be between 300 and 700 µm. In preferred embodiments, an average thickness of the adsorbent coating is between 60 and 180 µm. Note, the gap between the coated planar structures, the thickness of the coated planar structures, and the thickness of the adsorbent coating, are, each, measured along an average direction of the linear guiding element or a local section thereof.

In certain embodiments, the linear guiding element has a cylindrical shape, having an average outer diameter that is between 0.8 and 1.2 cm. More preferably, the linear guiding element is a hollow tube, which has an average axial thickness that is between 350 and 450 µm. The diameter of the cylindrical shape is measured perpendicularly to the average direction of the linear guiding element. The axial thickness of the tube is measured radially, in a plane perpendicular to said average direction.

In certain embodiments, the adsorbent coating comprises a micro pore zeolite. In certain embodiments, the adsorbent coating comprises $(SiO_2)_x(Al_2O_3)_y(P_2O_5)_z$.

According to certain embodiments, an AdHEX system is provided, wherein the system comprises one or more AdHEX parts as described above.

In certain embodiments, the system comprises one or more temperature swing separation columns, each including one or more of the AdHEX parts described above.

In certain embodiments, the system comprises two or more of said temperature swing separation columns, in which one of the columns connects to another one of the columns. In these embodiments, the system is configured to drive one column with waste heat from another column connecting to said one column. The system may be configured to separate carbon dioxide from one or more other gases.

In certain embodiments, the system further includes a power station and the columns of the system are configured so as to be driven by waste heat from said power station.

According to certain embodiments, a method of fabricating an AdHEX part is provided. The method includes providing a linear guiding element and a plurality of planar structures, each having fins; coating the fins with an adsorbent coating; bringing the planar structures at desired positions by sliding the planar structures along the linear guiding element, each of the planar structures mounted on the linear guiding element via respective joint elements configured to cooperate with the linear guiding element to form respective slider joints, so as to reduce an average gap between each pair of consecutive ones of the planar structures; and fixing the planar structures on the linear guiding element to restrict linear sliding movement of the planar structures to form an arrangement of fixed, coated planar structures that are stacked along the linear guiding element.

The planar structures can thus be slid along the linear guiding element so as to reduce an average gap between each pair of consecutive ones of the planar structures. Finally, the planar structures are fixed on the linear guiding element to preclude linear sliding movement of the planar structures, notwithstanding the slider joints. Eventually, an arrangement is formed, which includes fixed, coated planar structures that are stacked along the linear guiding element.

In certain embodiments, the method further comprises, prior to coating the fins of the planar structures: mounting the planar structures onto an elongated element via the respective joint elements; and placing the planar structures at first positions along the elongated element, so as to ensure a minimal gap between each pair of consecutive ones of the planar structures. In addition, the fins of the planar structures are coated by first placing the elongated element substantially parallel to a liquid comprising the adsorbent coating, so as for a portion of each of the planar structures to dip in the liquid, and by rotating the elongated element to impregnate the fins of the planar structures with the adsorbent coating. Once coated, the planar structures can be mounted on the linear guiding element (when the latter is distinct from said elongated element) and slid along the linear guiding element to reduce the gap between the planar structures.

In certain embodiments, the liquid is a liquid suspension that comprises particles of the adsorbent coating and a binder. In that case, the planar structures can be coated by letting the particles bind to the fins due to the binder. The particles may comprise a micro pore zeolite, as described herein.

In certain embodiments, the liquid is a reactive liquid mixture, which supports synthesis of an adsorbent layer on the fins. In that case, the planar structures are coated by letting the reactive liquid mixture react with the fins to form said adsorbent coating.

In certain embodiments, the planar structures are, after coating, brought to said desired positions so as to reduce the average gap to a value that is, e.g., between 500 and 900 µm, the gap measured along an average direction of the linear guiding element.

In certain embodiments, the linear guiding element is a hollow tube and the planar structures are fixed on the tube by hydraulic expansion of the tube. In certain embodiments, the planar structures are fixed on the linear guiding element by mechanical swaging. In other embodiments, the planar structures are fixed on the linear guiding element by soldering the planar structures thereon. For example, the linear guiding element provided may be coated with a solder and the planar structures fixed on the linear guiding element by soldering the planar structures thereon with the solder.

Embodiments of adsorption heat exchanger parts, methods of fabrication thereof, and systems comprising such AdHEX parts will now be described, by way of non-limiting examples, and in reference to the accompanying drawings.

The above summary is not intended to describe each illustrated embodiment or every implementation of the present disclosure.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

The accompanying drawings show simplified representations of devices or parts thereof, as involved in the embodiments. Technical features depicted in the drawings are not to scale. On the contrary, some dimensions and aspect ratios are purposely exaggerated, for pedagogical purposes. Similar or functionally similar elements in the figures have been allocated the same numeral references, unless otherwise indicated. Note, all references "Sij" refer to fabrication methods steps of the flowchart of FIG. 14, while numeral references pertain to physical parts or components of the present devices and systems.

DETAILED DESCRIPTION

With certain methods of fabricating AdHEX parts, they may require a minimal separation (spacing) between the successive planar fins. With such fabrication methods, attempting to reach smaller gaps between the planar fins typically causes the coating suspension to form capillary bridges between adjacent fins, such that gaps between the planar fins end up being clogged with the adsorbent coating after drying. Clogged gaps substantially reduce mass transport rates, which results in deteriorating the performance of the AdHEX. Smaller gaps may also prevent the coating suspension from infiltrating the gaps between fins when coating the fins, in which case no effective adsorbent layer may be produced on the AdHEX at all.

In reference to FIGS. 1-12, an aspect of certain embodiments is first described, which concerns an adsorption heat exchanger part. As noted earlier, "adsorption heat exchanger" is abbreviated as "AdHEX" in the present disclosure.

Figure 1A:
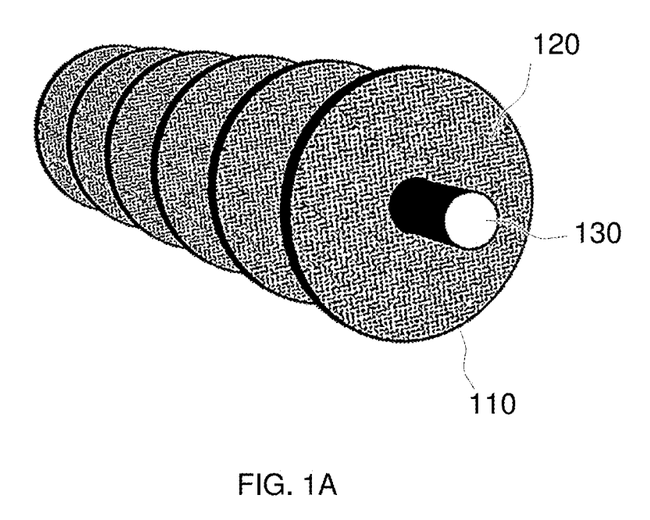
FIG. 1A is a three-dimensional view of planar structures (comprising fins) that are mounted on an elongated element, prior to impregnating the fins of the planar structures with an adsorbent coating, according to certain embodiments of methods of fabricating the parts.
Figure 1B:
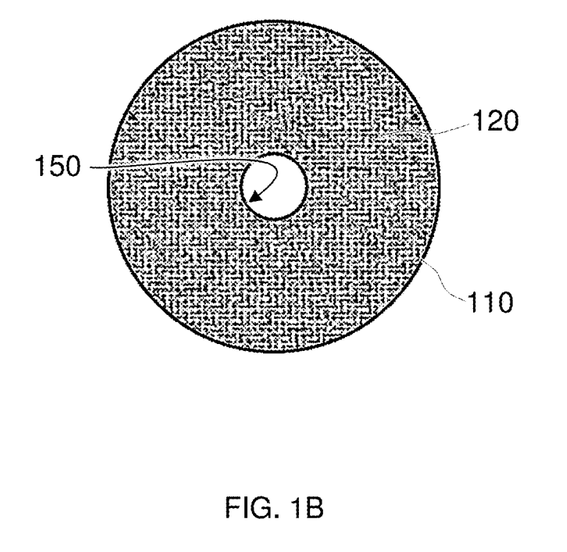
FIG. 1B is a side view of the planar structure shown in FIG. 1A.

As shown in FIG. 1, this part 105 includes a linear guiding element 140 (see, FIG. 6) and a plurality of planar structures 110. In certain embodiments, each planar structure is essentially shaped as a disk. Also, each of the planar structures includes (or form) fins 120. Therefore, such planar structures may themselves be referred to as planar fins.

The fins are surfaces, or surface elements, that are designed, shaped, and dimensioned, to increase the rate of heat transfer to/from the environment of the planar structures. The fins may for example extend from the planar structures or somehow form a pattern in and/or on the planar structures, as known per se. Such fins aim at increasing the effectiveness of the planar structures 110. The fins may possibly be formed as stamped fins or corrugate fins. They may notably be configured as, e.g., rectangular fins, wavy fins, offset strip fins, or louvered fins, or be designed as plain, herringbone, or serrated and perforated fins, as in known designs of plate-fin heat exchangers. The structures/fins are preferably made of aluminum, though other materials (e.g., metals) can be contemplated, as known per se.

Figure 4:
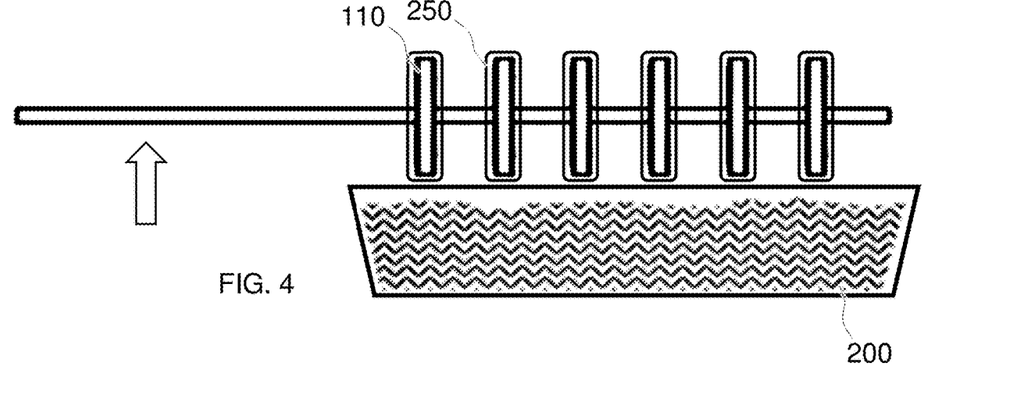

In certain embodiments, each of the planar structures 110 is coated with an adsorbent coating 250 (see, FIG. 4). The adsorbent coating may comprise a micro pore zeolite, for better performance, e.g., $(SiO_2)_x(Al_2O_3)_y(P_2O_5)_z$, such as in the so-called SAPO-34 compound.

Referring now to FIG. 1B, the planar structure 110 comprises a joint element 150 (i.e., in this case a hole) that is designed to cooperate with the elongated element of FIG. 1A to form a slider joint, whereby the planar structures can be mounted on the elongated element so as to ensure minimal gaps between the planar structures, see FIGS. 1A, and 2-5. Each planar structure 110 is mounted on the linear guiding element 140 (see, FIG. 6) via a joint element 150, see FIG. 1B. This joint element 150 is designed to cooperate with the linear guiding element 140 (or any similarly shaped elongated element 130 as shown in FIG. 1A) to form a slider joint (i.e., including the linear guiding element 140 and the joint element 150). An aim of the linear guiding element 140 is to cooperate with the correspondingly designed joint elements 150 of the planar structures 110 to form linear sliders.

For example, the joint element 150 may simply be a plain bearing, (i.e., a hole), provided in the planar structure 110 (e.g., generally shaped as a disk), as shown in FIG. 1B. A slider joint (i.e., including the linear guiding element 140 and the joint element 150) may also be referred to as a prismatic joint. The linear guiding element 140 can be a shaft, i.e., an axle, a tube, or any other elongated member (possibly structured) that allows, a priori, the planar structures 110 to be slid along the axis of the linear guiding element 140.

However, in the present case, each planar structure 110 is, at the end of the fabrication process, fixed on the linear guiding element 140, at a respective position. Each planar structure 110 is fixed in position thanks to a fixing means 160a, 160b (see, FIG. 8) that precludes, in fine, linear sliding movement of each of the planar structures 110, notwithstanding the slider joint (i.e., a combination of the linear guiding element 140 and the joint element 150). Several types of fixing means can be contemplated (e.g., resulting from hydraulic expansion of the linear guiding element, from mechanical swaging, or by soldering the planar structures on the guiding element), as discussed later in detail.

Thus, the AdHEX part forms an arrangement of coated structures 110 that are stacked along the linear guiding element 140 and fixed thereon. I.e., the fixing means eventually preclude movement of planar structures 110 along the linear guiding element 140, notwithstanding the slider joints 140, 150. That is, each of the joint elements 150 is configured to cooperate with the linear guiding element, so as to initially form a slider joint 140, 150 but the planar structures 110 are eventually fixed (after coating) on the linear guiding element and therefore blocked in respective positions. In other words, each planar structure 110 would be allowed to slide along the linear guiding element if it were not fixed thereon thanks to the fixing means 160a, 160b.

Figure 8:
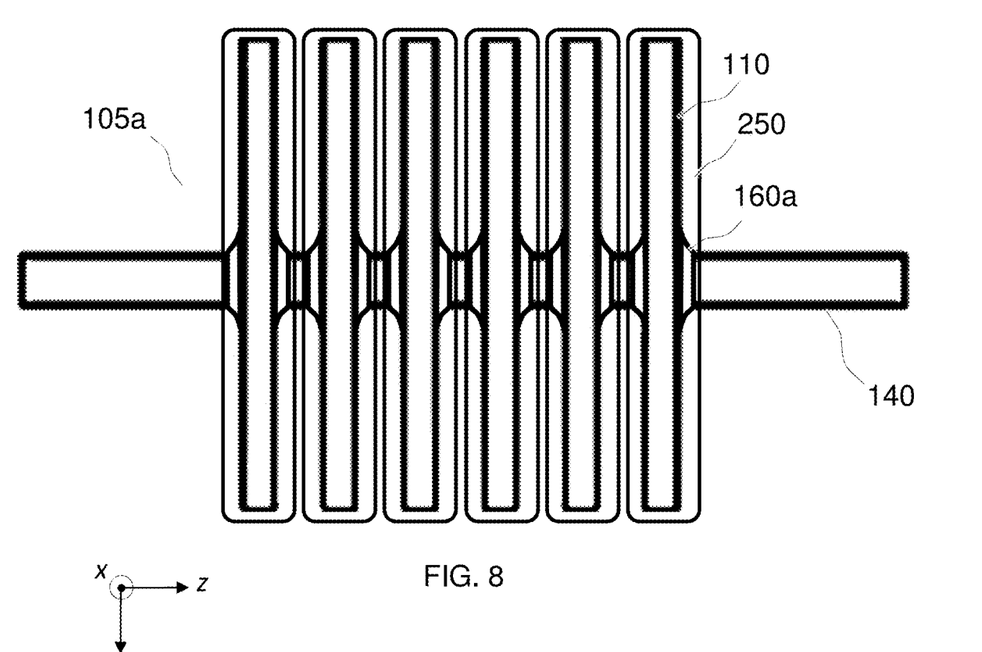
Figure 9:
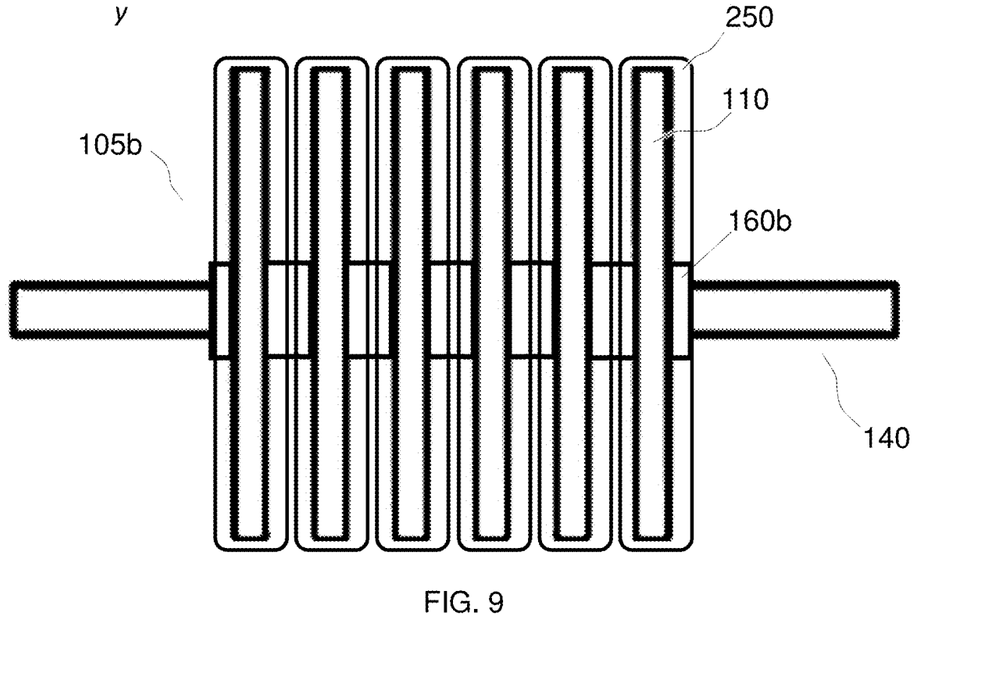
Figure 11:
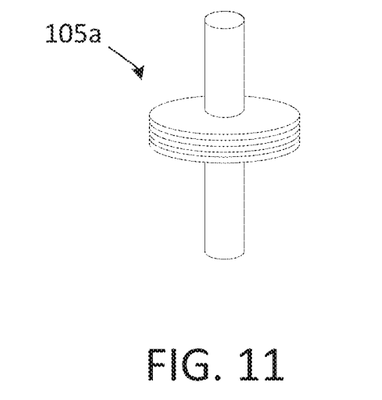
FIG. 11 is a photograph of an AdHEX part, as typically obtained according to certain embodiments.
Figure 12:
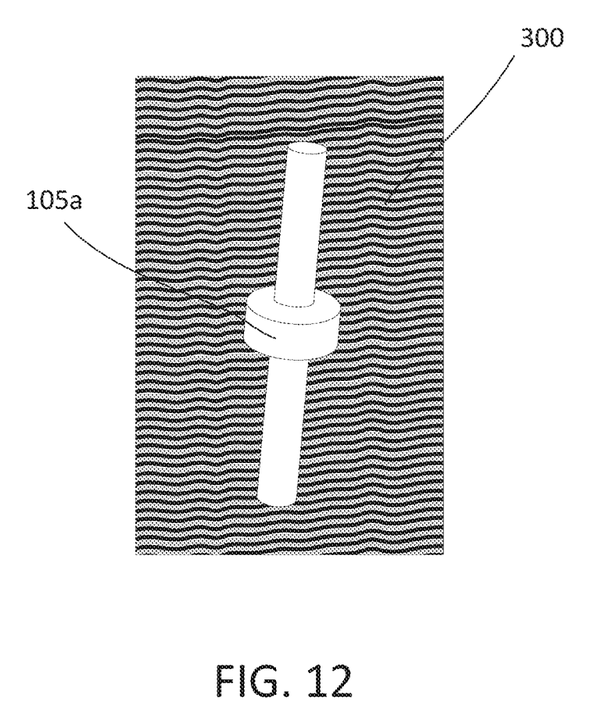
FIG. 12 is another photograph of the AdHEX part of FIG. 11, wherein the background of the photograph shows a related AdHEX part, which allows the respective densities of fin structures to be compared, according to embodiments.

The present embodiment designs and fabrication methods allow compact AdHEX parts 105, 105a (see, FIG. 8), 105b (see, FIG. 9) to be obtained (see FIG. 12, which also shows a related AdHEX part in the background), fin structures 300 of which have a much smaller density. The planar structures 110 may first be mounted on an elongated element 130 and spaced with relatively large gaps (FIGS. 1-5), so as to be easily coated with the adsorbent coating 250, see FIGS. 3-4. Then, the coated planar structures 110, 250 may be mounted on the linear guiding element 140 and brought closer to each other, i.e., closer than would be allowed by the coating process if they had been fixedly attached in the first place, see FIG. 6. Eventually, the coated structures 110, 250 can be fixed along the axis of the linear guiding element 140, as shown in FIGS. 8, 9, and 11. This is possible due to the fact that the planar structures 110 are, initially, movably mounted along the linear guiding element 140 and then fixed in position. I.e., the proposed design allows the planar structures 110 to be first coated with the adsorbent coating 250 and then brought close to each other to achieve smaller gaps than would normally be allowed by the coating process.

This way, the gaps that can eventually be achieved between the planar structures 110 can be narrower than the gaps allowed by prior art fabrication methods, which typically require a minimum separation of at least 1.2 mm, in order to make it possible to satisfactorily apply the adsorbent coating 250 onto the fins. Related methods can make it very difficult to achieve smaller gaps. For instance, as discussed above, trying to achieve smaller gaps may result in forming capillary bridges between adjacent planar structures 110, such that the gaps may end up being clogged with the adsorbent after drying. Clogged gaps substantially diminish mass transport rates and therefore deteriorate the performance of the AdHEX part. Even more so, smaller gaps may prevent the liquid from infiltrating the gaps between the fins, in which case no effective adsorbent layer may be obtained at all.

On the contrary, the present embodiments make it possible to safely reduce the gaps between the planar structures, which, in turn, results in more compact AdHEX parts with favorable performance in terms of power and energy density. In particular, the proposed approach makes it possible to obtain improved rates of transport, better power density, and thus a lower volume and cost requirement for a given power target.

All of these features are described in detail herein, in reference to particular embodiments. To start with, preferred dimensions of the AdHEX parts are now discussed in reference to FIG. 10, which schematically depicts an AdHEX part 105.

The average gap between each pair of consecutive, coated planar structures 110, 250, is preferably between 500 and 900 µm. For example, this average gap may be between 650 and 820 µm. It is preferably of approximately 740 µm, as assumed in FIG. 10. As discussed earlier, the depictions in the appended drawings are not drawn to scale. This gap is measured along the (local) average direction of the linear guiding element 140. Each gap is measured between two consecutive structures 110, 250, taking the thickness of the adsorbent coating 250 into account. The average direction may typically correspond to the average axis of the linear guiding element 140, which is assumed to be parallel to axis z in FIGS. 7-10. Still, the linear guiding element may possibly be shaped (and thus not be straight), in which case the average direction is locally measured along a section of the linear guiding element.

In embodiments, the average thickness of the coated planar structures 110, 250 is between 300 and 700 µm (taking the thickness of the adsorbent coating 250 into account). E.g., the average thickness of the coated planar structures 110, 250 may be between 400 and 600 µm, for example 500 µm, as assumed in FIG. 10. This thickness is measured along the average direction of the linear guiding element 140, i.e., the axis z in the accompanying drawings.

Figure 10:
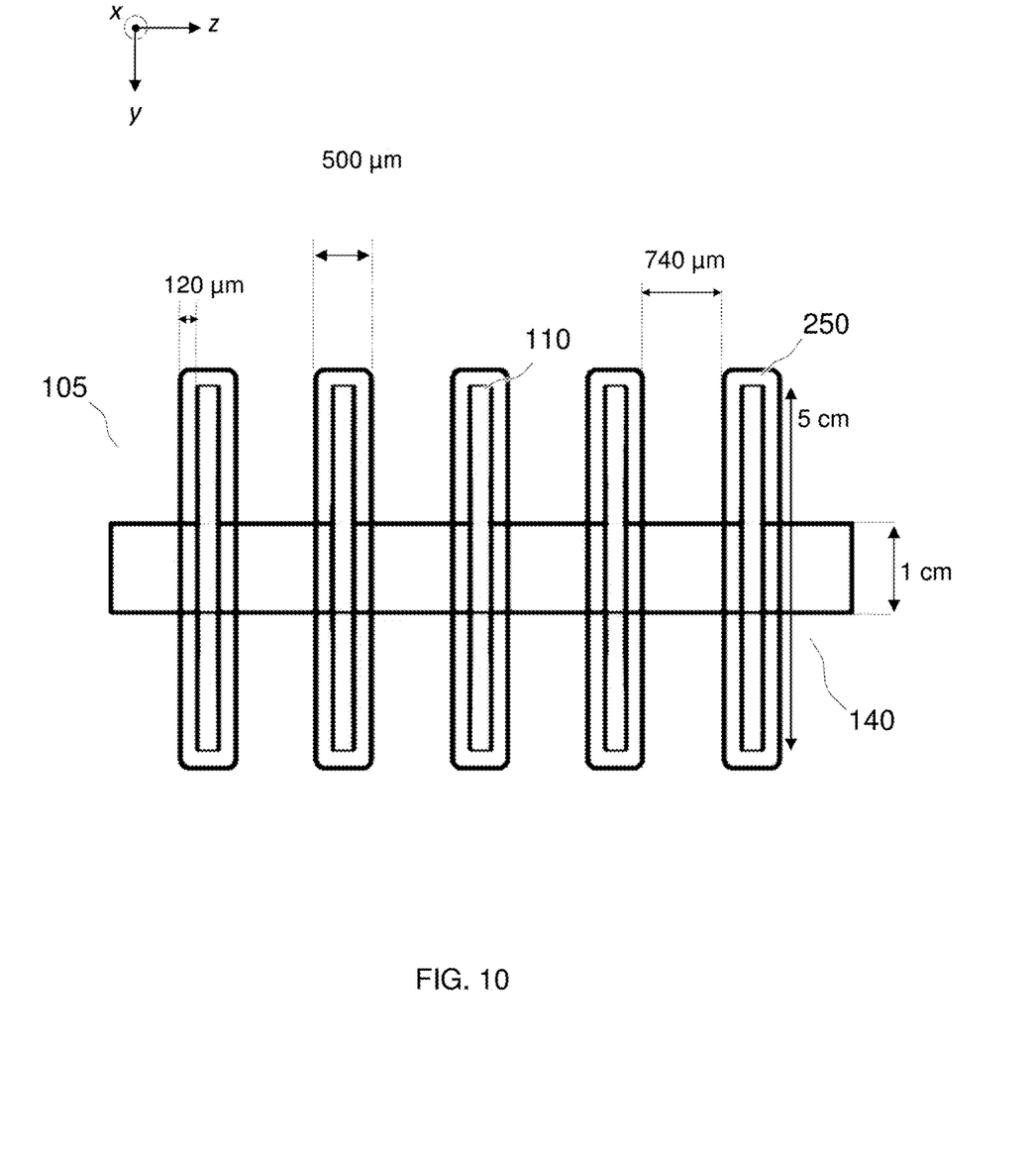

The average thickness of the sole adsorbent coating 250 is preferably between 60 and 180 µm, e.g., between 100 and 140 µm, for example 120 µm, as assumed in FIG. 10. This thickness is measured along the average direction of the linear guiding element 140, i.e., the axis z.

The linear guiding element 140 preferably has a cylindrical shape, to ease the assembly with the planar structures 110. In that case, the joint element 150 may simply be a circular hole, although more sophisticated joint may be contemplated. The cylindrical shape may for instance have an average outer diameter that is between 0.8 and 1.2 cm. This diameter may for example be of approximately 1 cm, as assumed in FIG. 10. The diameter of the cylindrical shape is measured perpendicularly to the average direction of the linear guiding element 140, i.e., in the plane (x, y) in the accompanying drawings. The average diameter of the planar structures is preferably between 1.4 cm and 5 cm, and more preferably less than 2.5 cm (e.g., 1.7 cm), to maintain satisfactory heat transfer rates, although it may, in principle, be larger.

In certain embodiments, the linear guiding element 140 is a hollow tube having an average axial thickness that is between 350 and 450 μm. This thickness may for example be of approximately 400 μm. A metal (e.g., aluminum) tube is preferably used, to favor heat transfer. The axial thickness of the tube is measured perpendicularly to the average direction of the linear guiding element 140, i.e., radially, in the plane (x, y) in the accompanying drawings.

As noted earlier, the adsorbent coating 250 preferably comprises a micro pore zeolite, which results in satisfactory performance in terms of heat transfer. In certain embodiments, though, the adsorbent coating 250 comprises $(SiO_2)_x(Al_2O_3)_y(P_2O_5)_z$. It may for example include or consist of SAPO-34, a micro pore zeolite. Such a compound has absorbing characteristics that are well suited for the present purposes (e.g., for vacuum swing or temperature swing adsorption processes) and can therefore advantageously be used as an adsorbent medium. In variants, other zeolites, carbon molecular sieves, metal organic frameworks, microporous polymers, and amine-modified sorbents may be used.

Figure 13:
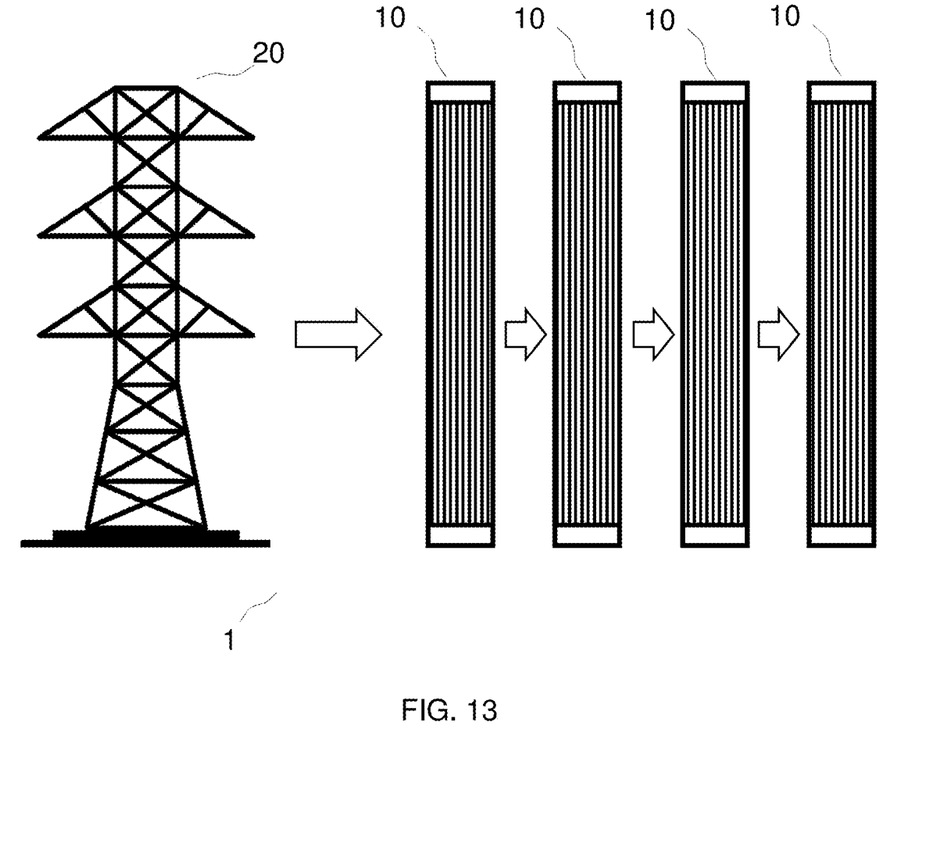
FIG. 13 is diagram of a system comprising several temperature swing separation columns, according to embodiments.
Figure 14:
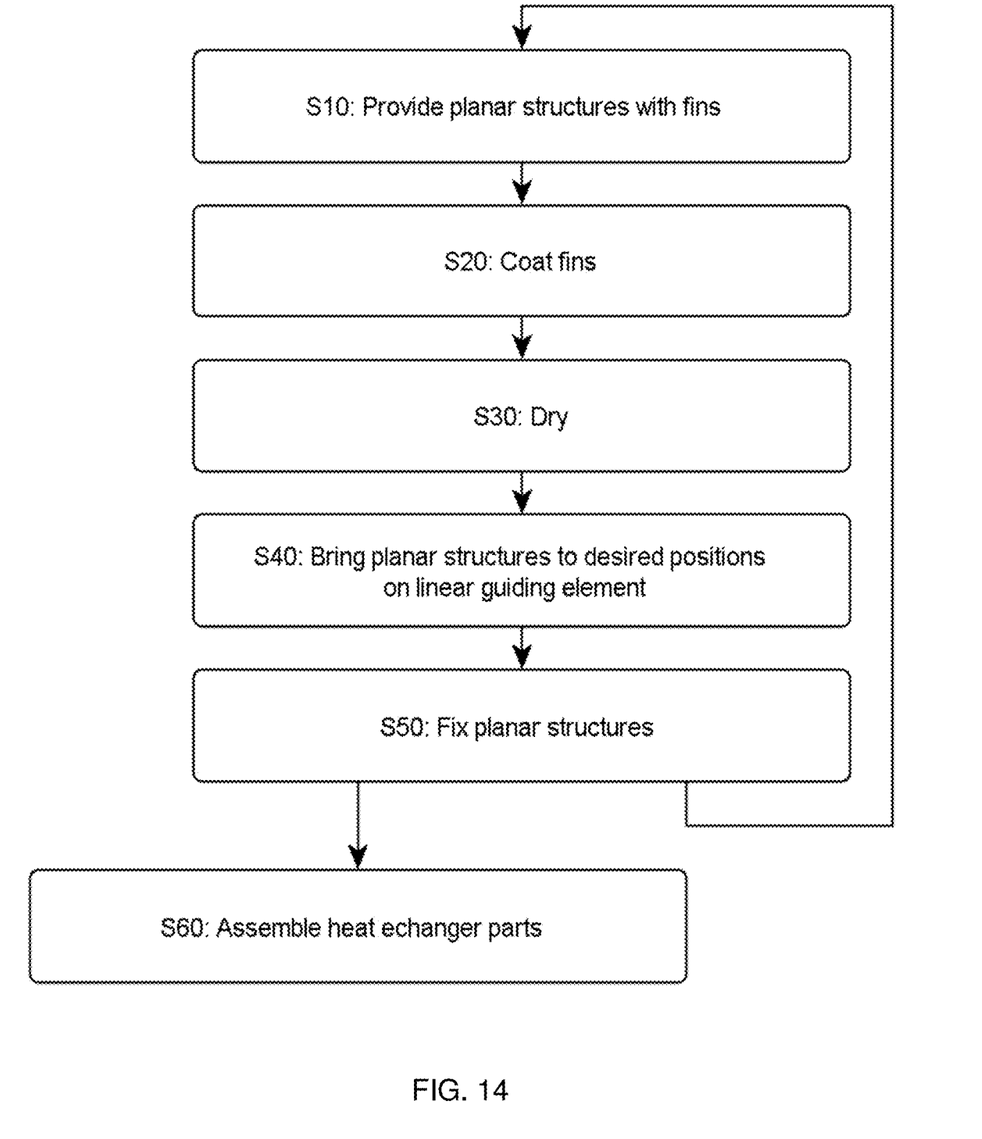
FIG. 14 is a flowchart illustrating high-level steps of a method of fabrication of an AdHEX part, according to embodiments.

Referring to FIGS. 13 and 14, another aspect of the present embodiments is now described, which concerns an AdHEX system 1. The system comprises at least one AdHEX part 105 as described above. In practice, however, the present systems may typically comprise several AdHEX parts 105.

In embodiments, the system 1 comprises one or more temperature swing separation columns 10, wherein each column 10 includes one or more AdHEX parts such as described above, as schematically depicted in FIG. 13. In particular, the present heat exchanger parts 105 may be used in a temperature swing adsorption (TSA) system 1 that is designed to reduce cycle times by co-optimizing mass and thermal transport by hierarchical paths and reduce column pressure drop by preferential flow path.

In embodiments, the system 1 comprises two or more of said temperature swing separation columns 10, in which the columns are connected, in particular thermally connected. E.g., one column may connect to an adjacent column, so as for the columns to be connected two-by-two. The system 1 may notably be configured to drive a connected column with waste heat from the column connecting thereto. I.e., a column can be driven with waste heat from a previous adsorbing column, thanks to small thermal gradients as allowed by the present embodiments.

In particular, the system 1 may be configured to separate carbon dioxide from one or more other gases (e.g., nitrogen or other gasses such as methane or carbon monoxide).

In embodiments, the system 1 includes a power station 20. There, the columns 10 of the system are configured so as to be driven by waste heat from the power station, as schematically depicted in FIG. 13. The system 1 may even solely be driven by the power station 20. For example, the system may be configured as a rapid temperature swing adsorption (RTSA) system, wherein RTSA carbon dioxide separators are driven by waste heat. Since the separation process can be entirely thermally driven by the power station 20, the energy output is not reduced. The process can be applied to gas adsorption separation processes that require pressure or temperature driven regeneration.

The system 1 may notably be designed to improve mass flows and reduce cycle times compared to standard TSA by a factor of approximately 10, thanks to improved thermal contact between drive heat and the adsorber media. Structured adsorbents are advantageously involved, in which the main flow channels reduce the column pressure drop. Then, the use of the heat can be optimized by driving a desorbing column with waste heat from a previous adsorbing column due to small thermal gradients. That is, one may combine, on the one hand, thermally driven pressure swing and temperature swing concepts and, on the other hand, water and gas heating to further improve speed and capacity of the columns 10.

Referring to FIGS. 1-6, and 14, another aspect of the present embodiments is now described in detail, which concerns a method of fabricating an AdHEX part 105. At operation S10, the method includes providing a linear guiding element 140 and a plurality of planar structures 110, each having fins 120, as described earlier.

Figure 5:
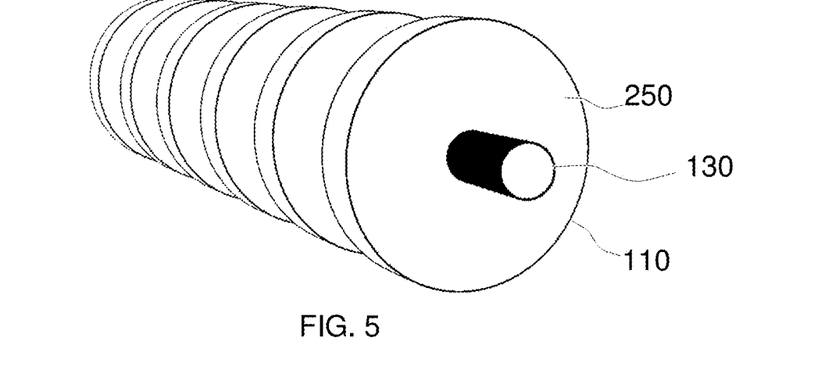
FIG. 5 is a three-dimensional view of the planar structures, showing the coated planar structures, still mounted on the elongated element, according to embodiments.
Figure 6:
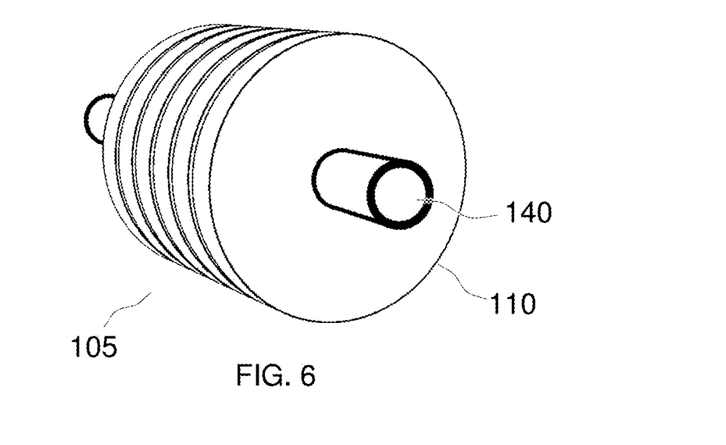
FIG. 6 is a three-dimensional view of the planar structures, illustrating how the planar structures, once impregnated, can be mounted on a linear guiding element (here assumed to be distinct from the elongated element of FIG. 5) and then brought to desired positions, by sliding the planar structures along the linear guiding element, to form a compact arrangement of stacked, coated planar structures, according to embodiments.
Figure 7:
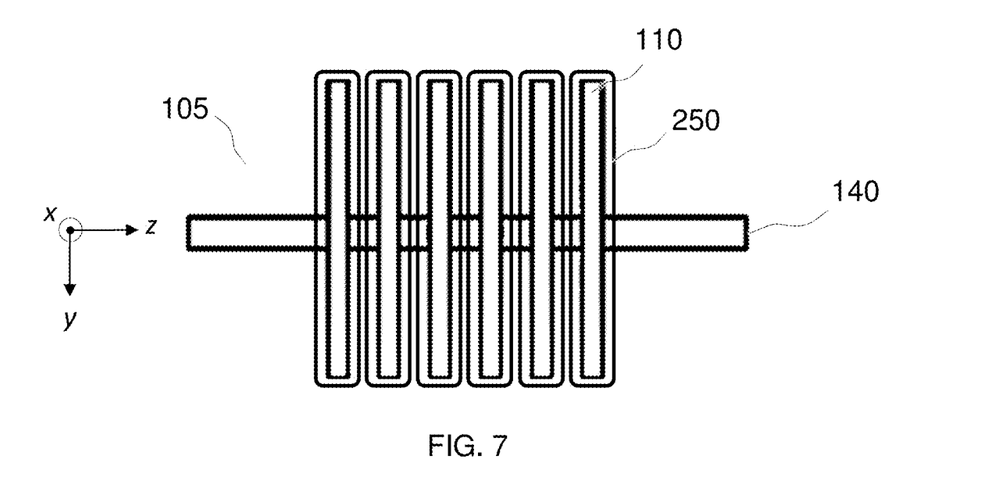
FIGS. 7, 8, 9, and 10 schematically show side views of AdHEX parts according to certain embodiments.

According to this method, at operation S20, the fins 120 of the planar structures 110 are first coated with an adsorbent coating 250 (FIGS. 2-5), and then dried at operation S30, prior to bringing the planar structures 110 at desired positions at operation S40, by sliding the coated planar structures 110, 250 along the linear guiding element 140, so as to reduce an average gap between each pair of consecutive ones of the planar structures 110, see FIG. 6. As explained earlier, this is made possible thanks to the slider joints 140, 150. That is, each planar structure 110 is mounted on the linear guiding element 140 via respective joint elements 150, where the latter are designed to cooperate with the linear guiding element 140 to form respective slider joints 140, 150.

Once in position, the planar structures 110 are fixed on the linear guiding element 140 at operation S50, so as to preclude linear sliding movement of the planar structures 110, notwithstanding the slider joints 140, 150. Eventually, an arrangement of fixed, coated planar structures 110, 250 is obtained, wherein the coated planar structures 110, 250 are stacked along the linear guiding element 140. The resulting AdHEX parts 105, 105a, 105b can then be used S60 in heat exchanger systems such as discussed above.

Figure 2:
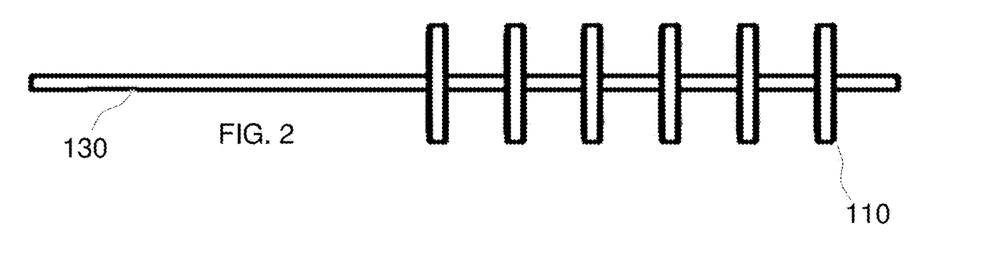
FIGS. 2, 3 and 4 are side views illustrating how the fins of the planar structures of FIG. 1A can be impregnated with an adsorbent coating, according to embodiments.
Figure 3:
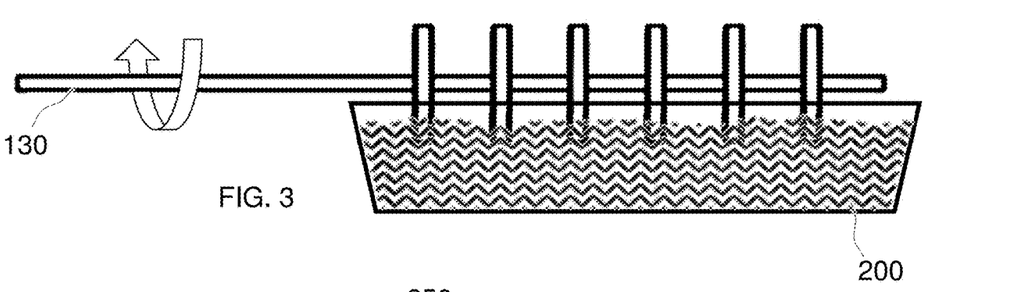

In certain embodiments, an elongated element 130 is used to coat the fins 120 of the planar structures 110 at operation S20, by rotating the planar structures in a liquid. That is, the planar structures 110 are mounted on the elongated element 130 via the respective joint elements 150, and then placed at first respective positions along the elongated element 130, so as to ensure a minimal gap (e.g., larger than 3 or 5 mm) between each pair of consecutive planar structures 110, as depicted in FIGS. 1A and 2. Next, the elongated element 130 is placed substantially parallel to a liquid 200 (i.e., a solution, typically a slurry) that comprises the adsorbent coating, so as for a portion of each of the planar structures 110 to dip in the liquid, as shown in FIG. 3. The elongated element 130 is then rotated (see FIG. 3) to apply the adsorbent coating 250 to the fins 120 of the planar structures 110, as depicted in FIG. 4.

Note, FIGS. 1-4 assume that the elongated element is distinct from the linear guiding element 140. This elongated element 130 may for instance be a rotating spindle, enabling a slider joint mechanism similar to that described earlier in reference to the element 140. The spindle (or elongated element 130) is placed so as to rest on edges of the container containing the slurry (or liquid 200), to allow rotation thereof, see FIG. 3. In variants, however, the elongated element may in fact already be the linear guiding element 140 described earlier.

As discussed earlier, the liquid 200 preferably comprises a micro pore zeolite, e.g., $(SiO_2)_x(Al_2O_3)_y(P_2O_5)_z$. In particular, the liquid 200 may be a liquid suspension that comprises a binder, in addition to particles of the adsorbent coating. In that case, the fins 120 of the planar structures 110 are coated at operation S30 so as to let the particles bind to the fins 120, thanks to the binder.

In variants, the liquid is a reactive liquid mixture, which supports synthesis of an adsorbent layer on the fins 120. In that case, the fins 120 of the planar structures 110 are coated by letting the reactive liquid mixture react with the fins 120, so as to form the desired adsorbent coating 250.

After the fins 120 of the structures 110 have been adequately coated at operation S30, the coated structures 110, 250 are dried (or allowed to dry), and then mounted on the element 140, thanks to the slider joint mechanism described earlier, see, e.g., FIG. 5. As further depicted in FIG. 6, the planar structures 110 are then brought to desired positions on the element 140, so as to reduce the average gap between the structures 110, 250, e.g., to a value that is between 500 and 900 µm, as indicated earlier.

As discussed earlier too, the linear guiding element 140 is preferably a hollow tube. In that case, the planar structures 110 may be simply fixed at operation S50 on the tube by performing a hydraulic expansion of the tube, as schematically depicted in FIG. 9, where the diameter of a portion 160b of the tube is expanded to permanently fix the structures 110. Several hydraulic expansion mechanisms are known per se, which can adequately be used for the present purpose.

In variants, the planar structures 110 may possibly are fixed on the linear guiding element 140 by mechanical swaging, using either a cold or a hot working process. The dimensions of the tube (or linear guiding element) 140 are locally altered, which results in locally increasing the diameters of portions (or fixing means 160a) sandwiching the structures 110, so as to block the latter in position, similar to what is shown in FIG. 8.

In other embodiments, the planar structures 110 may be fixed on the linear guiding element 140 by soldering the planar structures 110 thereon. The coated structures 110 may for instance be fixed by adding a solder paste a posteriori. More practical, however, is to coat the linear guiding element a priori. That is, the linear guiding element 140 may be coated with a solder, such that the planar structures 110 may be fixed on the linear guiding element 140 by soldering the planar structures 110 thereon with the solder.

In further embodiments, simple gaskets (or fixing means 160a) may be used to fix the relative positions of the coated structures 110, 250, as shown in FIG. 8. The outermost structures may subsequently be fixed, if needed, using any suitable mechanism.

The above embodiments have been succinctly described in reference to the accompanying drawings and may accommodate a number of variants. Several combinations of the above features may be contemplated. Examples are given below.

In particularly preferred embodiments, the AdHEX part comprises at least one tube section or linear guiding element 140, with disk-shaped fins or planar structures 110 arranged along the tube. A layer (adsorbent coating 250) of adsorbent material (e.g., SAPO-34) is coated on the fins or planar structures 110 by submerging the AdHEX assembly in a liquid suspension comprising adsorbent particles and a binder. The suspension adheres to the AdHEX, and, upon drying, leaves a layer of adsorbent coating. In variants, the AdHEX assembly of tubes and fins is submerged in a reactive liquid mixture, which supports synthesis of an adsorbent layer directly on the AdHEX, as noted above.

This allows small fin gaps to be obtained, which results in favorable performance in terms of power and energy density. An adsorbent suspension with high adsorbent fraction may be used during the coating step, whereby a desired coating thickness (e.g., between 400 µm and 600 µm) can be obtained in a single coating step. In contrast, prior art methods typically rely on lower viscosity suspension to allow the suspension to enter the gap between fins, which results in lower coating yield per dipping step and therefore requires multiple dipping steps to achieve the desired coating thickness, which is detrimental in terms of processing time and cost. As a further advantage compared to prior art methods, the present approach enables improved control of adsorbent coating thickness by varying the rotation of the fins during the coating procedure, FIG. 3.

The geometry can be optimized to enhance performance By calculating the transport impedances in the adsorbent coating, aluminum fin, and fin-to-tube interface, the inventors have determined optimal ranges for the components of the AdHEX part 105. Namely:

The adsorbent thickness is between 60 µm and 180 µm;

The diameter of the planar fins 110, 120 is between 1.4 cm and 2.5 cm;

The fin thickness is between 300 µm and 700 µm;

The gaps between the planar fins is between 500 µm and 900 µm, something that cannot be achieved with prior art methods;

The outer diameter of the tube is between 0.8 cm and 1.2 cm;

The thickness of the tune is between 350 µm and 450 µm.

Adopting such dimensions turns out to be particularly well suited for adsorption cooling applications with desorption temperature of approximately 75 C, a condenser temperature of approximately 30 C, and an evaporator pressure of approximately 12.4 mbar, as used in actual heat exchanger systems.

Performance was calculated for adsorption cooling conditions as listed above, using a thermodynamic model. As a result, a 12-fold improvement in adsorption cooling power density can in principle be achieved.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiments. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An adsorption heat exchanger part comprising:
a linear guiding element; and
a plurality of planar structures that include fins,
wherein each of the planar structures is:
mounted on the linear guiding element via a joint element, the joint element configured to cooperate with the linear guiding element to form a slider joint,
coated with an adsorbent coating, and
fixed on the linear guiding element, at a respective position, by a fixing means that restricts linear sliding movement of each of the planar structures to form an arrangement of coated planar structures that are stacked along the linear guiding element, and
wherein an average gap between each pair of consecutive ones of the fixed planar structures is between 500 and 900 μm, the gap measured along a longitudinal direction of the linear guiding element.

2. The adsorption heat exchanger part according to claim 1, wherein an average thickness of the coated planar structures is between 300 and 700 μm, the thickness measured along a longitudinal direction of the linear guiding element.

3. The adsorption heat exchanger part according to claim 1, wherein an average thickness of the adsorbent coating is between 60 and 180 μm, the thickness measured along an a longitudinal direction of the linear guiding element.

4. The adsorption heat exchanger part according to claim 1, wherein the planar structures are shaped as disks.

5. The adsorption heat exchanger part according to claim 1, wherein the linear guiding element has a cylindrical shape, having an average outer diameter that is between 0.8 and 1.2 cm, the diameter measured perpendicularly to a longitudinal direction of the linear guiding element.

6. The adsorption heat exchanger part according to claim 5,
wherein the linear guiding element is a hollow tube having an average axial thickness that is between 350 and 450 μm,
wherein the axial thickness is measured radially, in a plane perpendicular to the longitudinal direction of the linear guiding element.

7. The adsorption heat exchanger part according to claim 1, wherein the adsorbent coating comprises a micro pore zeolite.

8. The adsorption heat exchanger part according to claim 7, wherein the adsorbent coating comprises $(SiO_2)_x(Al_2O_3)_y(P_2O_5)_z$.

9. An adsorption heat exchanger system comprising adsorption heat exchanger parts, wherein each of the adsorption heat exchanger parts comprises:
a linear guiding element; and
a plurality of planar structures that include fins,
wherein each of the planar structures is:
mounted on the linear guiding element via a joint element, the joint element configured to cooperate with the linear guiding element to form a slider joint,
coated with an adsorbent coating, and
fixed on the linear guiding element, at a respective position, by a fixing means that restricts linear sliding movement of each of the planar structures to form an arrangement of coated planar structures that are stacked along the linear guiding element, and
wherein an average gap between each pair of consecutive ones of the fixed planar structures is between 500 and 900 μm, the gap measured along a longitudinal direction of the linear guiding element.

10. The system according to claim 9, wherein the system is configured to separate carbon dioxide from one or more other gases.

11. The system according to claim 9, wherein the system further comprises one or more temperature swing separation columns, each including one or more of the adsorption heat exchanger parts.

12. The system according to claim 11, wherein the system comprises two or more of the temperature swing separation columns, in which one of the temperature swing separation columns is connected to another one of the temperature swing separation columns, and
is configured to drive the another one of the temperature swing separation columns with waste heat from the one of the temperature swing separation columns, in operation.

13. The system according to claim 11, wherein the system further includes a power station, and the temperature swing separation columns of the system are configured so as to be driven by waste heat from the power station.

14. A method of fabricating an adsorption heat exchanger part, wherein the method comprises:
providing a linear guiding element and a plurality of planar structures, each having fins;
coating the fins with an adsorbent coating;
bringing the planar structures at desired positions by sliding the planar structures along the linear guiding element, each of the planar structures mounted on the linear guiding element via respective joint elements configured to cooperate with the linear guiding element to form respective slider joints, so as to reduce an average gap between each pair of consecutive ones of the planar structures; and
fixing the planar structures on the linear guiding element to restrict linear sliding movement of the planar structures to form an arrangement of fixed, coated planar structures that are stacked along the linear guiding element,
wherein an average gap between each pair of consecutive ones of the fixed planar structures is between 500 and 900 μm, the gap measured along a longitudinal direction of the linear guiding element.

15. The method according to claim 14, wherein the planar structures are brought to said desired positions so as to reduce the average gap to a value that is between 500 and 900 pm, the gap measured along a longitudinal direction of the linear guiding element.

16. The method according to claim 14, wherein the linear guiding element is a hollow tube, and the planar structures are fixed on the tube by hydraulic expansion of the tube.

17. The method according to claim 14, wherein the planar structures are fixed on the linear guiding element by mechanical swaging.

18. The method according to claim 14, wherein the planar structures are fixed on the linear guiding element by soldering the planar structures thereon.

19. The method according to claim 18, wherein the linear guiding element provided is coated with a solder, and the planar structures are fixed on the linear guiding element by soldering the planar structures thereon with the solder.

20. The method according to claim 14, wherein
the method further comprises, prior to coating the fins:
mounting the planar structures onto an elongated element via the respective joint elements; and placing the planar structures at first positions along the elongated element, so as to ensure a minimal gap between each pair of consecutive ones of the planar structures, and coating the fins further comprises:

placing the elongated element substantially parallel to a liquid comprising the adsorbent coating, so as for a portion of each of the planar structures to dip in the liquid; and rotating the elongated element to impregnate the fins with the adsorbent coating.

21. The method according to claim 20, wherein the liquid is a reactive liquid mixture, which supports synthesis of an adsorbent layer on the fins, and coating the fins further comprises reacting the reactive liquid mixture with the fins to form said adsorbent coating.

22. The method according to claim 20, wherein the liquid is a liquid suspension that comprises particles of the adsorbent coating and a binder, and coating the fins further comprises binding the particles to the fins with the binder.

23. The method according to claim 22, wherein the particles comprise a micro pore zeolite.

\* \* \* \* \*